United States Patent [19]
McCallister et al.

[11] Patent Number: 5,995,551
[45] Date of Patent: Nov. 30, 1999

[54] ROTATIONALLY INVARIANT PRAGMATIC TRELLIS CODED DIGITAL COMMUNICATION SYSTEM AND METHOD THEREFOR

[75] Inventors: Ronald D. McCallister, Scottsdale; Bruce A. Cochran, Mesa; John M. Liebetreu, Scottsdale, all of Ariz.

[73] Assignee: Sicom, Inc., Scottsdale, Ariz.

[21] Appl. No.: 08/912,225

[22] Filed: Aug. 15, 1997

[51] Int. Cl.$^6$ .............................. H04L 5/12; H04L 23/02
[52] U.S. Cl. ......................... 375/265; 375/341; 371/43.4
[58] Field of Search .................................. 375/262, 265, 375/316, 341, 346; 371/37.8, 43.4, 43.5, 43.6, 43.8

[56] References Cited

U.S. PATENT DOCUMENTS

| | | | |
|---|---|---|---|
| 4,601,044 | 7/1986 | Kromer, III et al. | 375/17 |
| 5,233,629 | 8/1993 | Paik et al. | 375/39 |
| 5,233,630 | 8/1993 | Wolf | 375/67 |
| 5,396,518 | 3/1995 | How | 375/265 |
| 5,428,631 | 6/1995 | Zehavi | 371/43 |
| 5,469,452 | 11/1995 | Zehavi | 371/43 |
| 5,497,401 | 3/1996 | Ramaswamy et al. | 375/341 |
| 5,535,228 | 7/1996 | Dong et al. | 371/43 |
| 5,541,955 | 7/1996 | Jacobsmeyer | 375/222 |
| 5,633,881 | 5/1997 | Zehavi et al. | 375/308 |
| 5,651,032 | 7/1997 | Okita | 375/341 |
| 5,740,203 | 4/1998 | Ramaswamy et al. | 375/341 |
| 5,757,856 | 5/1998 | Fang | 375/265 |

OTHER PUBLICATIONS

Viterbi et al., "A Pragmatic Approach to Trellis–Coded Modulation", IEEE Communications Magazine, Jul. 1989, pp. 11–19.

D. Delaruelle, "A Pragmatic Coding Scheme for Transmission of 155 mbit/s SDH and 140 Mbit/S PDH Signals over 72 MHz Transponders", Proc.ICDSC–10, Brighton, May 1995.

G. David Forney, Jr and Edward K. Hower, "A High–Speed Sequential Decoder: Prototype Design and Test", IEEE Transactions on Communication Technology, Oct. 1971, vol. Com–19 No. 5pp. 821–835.

M. Vanderaar et al., A Low Complexity Digital Encoder–Modulator for High Data Rate Satellite BISDN Applications,IEEE 1996, pp. 357–363.

Pietrobon et al., "Trellis–Coded Multidimensional Phase Modulation," IEEE Transactions on Information Theory, Jan. 1990, vol. 36 No. 1.

*Primary Examiner*—Chi H. Pham
*Assistant Examiner*—Bryan Webster
*Attorney, Agent, or Firm*—Meschkow & Gresham, P.L.C.; Lowell W. Gresham; Jordan M. Meschkow

[57] ABSTRACT

A communication system (10) includes a rotationally invariant pragmatic trellis coded modulator (18) and demodulator (34). The modulator (18) partitions information bits (20) into primary (42) and secondary (44) data streams. The secondary data stream (44) is convolutionally encoded (70) then fed to the LSB of a phase mapper (76). The phase mapper (76) is arranged so that all pairs of adjacent phase data are generated from pairs of opposing polarity LSB inputs. The primary data stream (42) is differentially encoded through a dual channel differential encoder (50). The demodulator (34) convolutionally decodes (90) the secondary stream, then re-encodes (96) secondary stream estimates. The re-encoded secondary stream estimates are used to remove (102) the secondary modulation from phase value estimates. Adjusted phase value estimates are phase demodulated (104) and differentially decoded using a dual channel differential decoder (106).

25 Claims, 5 Drawing Sheets

80

82

ROTATIONALLY INVARIANT PRAGMATIC TRELLIS CODED DIGITAL COMMUNICATION SYSTEM AND METHOD THEREFOR

TECHNICAL FIELD OF THE INVENTION

The present invention relates generally to the field of digital communications. More specifically, the present invention relates to rotationally invariant encoders and decoders for pragmatic trellis coded modulation.

BACKGROUND OF THE INVENTION

Pragmatic trellis coded modulation (PTCM) has become popular because it allows a common basic encoder and decoder to achieve respectable coding gains for a wide range of bandwidth efficiencies (e.g. 1–6 b/s/Hz) and a wide range of coding applications, such as 8-PSK, 16-PSK, 16-QAM, 32-QAM, etc.

In general, PTCM employs primary and secondary modulation schemes. The words "primary" and "secondary" do not indicate relative importance. Rather, the secondary modulation is simply applied to a first subset of information bits, and the primary modulation is applied to the remaining information bits. Conventionally, the secondary modulation scheme differentially encodes its subset of information bits, then encodes these differentially encoded bits with a strong error detection and correction code, such as the well known K=7, rate 1/2 "Viterbi" convolutional code (i.e. Viterbi encoding). The primary modulation scheme need do no more than differentially encode its subset of the information bits. The resulting symbols from the primary and secondary modulation schemes are then concurrently phase mapped to generate quadrature components of a transmit signal. The symbol data are conveyed through the phase and amplitude relationships between the quadrature components of the transmit signal.

Carrier-coherent receiving schemes are often used with PTCM because they demonstrate improved performance over differentially coherent receiving schemes. Coherent receivers become phase synchronized to the received signal carrier in order to extract the amplitude and phase relationships indicated by the quadrature components. However, an ambiguity results because the receiver inherently has no knowledge of an absolute phase reference, such as zero. In other words, where one of $2^K$ possible phase states are conveyed during each unit interval (i.e. reciprocal of baud), where K equals the number of symbols conveyed per unit interval, then the receiver may identify any of the $2^K$ phase states as the zero phase state. This ambiguity must be resolved before the conveyed phase and amplitude data successfully reveal the information bits.

Conventionally, the differential encoding allows decoding circuits to eliminate the phase ambiguity problem with respect to the secondary modulation. However, differential encoding and decoding of secondary modulation does not establish an absolute phase reference or solve the ambiguity problem with respect to the primary modulation. When the secondary modulation is decoded, these decoded bits are then used, perhaps with an inverted polarity, to re-generate the secondary modulation for use in decoding the primary modulation.

Unfortunately, such schemes have conventionally been rotationally variant for higher orders of modulation (i.e. higher than QPSK). In other words, at higher orders of modulation the decoders cannot remain locked regardless of which phase reference point is originally selected. As a result, when the decoder locks at some phase states, the differential decoding on the secondary modulation allows the decoder to quickly begin decoding data. However, when the decoder locks at other phase states, an extensive and time consuming normalization rate detection process is performed to regain lock.

The difficulty in achieving rotational invariance is believed to be caused, at least in part, by choosing a scheme for mapping symbols generated by convolutional encoders to phase points which excessively comingles primary and secondary modulation symbols in the resulting phase constellation. For example, conventional digital communication schemes attempt to convey more than one convolutionally encoded symbol from a given secondary information bit stream per unit interval. In addition, conventional digital communication schemes use Gray codes for mapping symbols generated by encoders to phase points. While Gray codes may be desirable for some error detection purposes, they impose an interdependence between adjacent codes (i.e. sequential numbers are represented by expressions that differ by only one bit) that further commingles primary and secondary modulation symbols in the resulting phase constellation.

SUMMARY OF THE INVENTION

Accordingly, it is an advantage of the present invention that an improved rotationally invariant pragmatic trellis coded digital communication system and method are provided.

Another advantage of the present invention is that a modulator and demodulator are provided which are rotationally invariant.

Another advantage of the present invention is that a modulator and demodulator are provided which implement a rotationally invariant pragmatic trellis coded modulation scheme for use at modulation orders higher than QPSK.

The above and other advantages of the present invention are carried out in one form by a rotationally invariant pragmatic trellis coded modulator for encoding information bits to be communicated so that phase ambiguities are resolvable. The modulator includes a first differential encoder which produces a first encoded symbol stream in response to a first portion of the information bits. A second differential encoder is adapted to receive a second portion of the information bits. A rate 1/N encoder, where N>1, is coupled to the second differential encoder to produce a second encoded symbol stream which is responsive to the second portion of the information bits. A phase mapper has at least three inputs so that it maps at least three symbols per unit interval from the first and second encoded symbol streams. The phase mapper couples to the first differential encoder and to the rate 1/N encoder so that no more than one symbol from the second encoded symbol stream is mapped per unit interval.

The above and other advantages of the present invention are carried out in another form by a rotationally invariant pragmatic trellis coded demodulator for decoding communicated information bits received with potential phase ambiguities. The demodulator includes a phase estimator configured to generate a stream of phase estimates. A phase rotator couples to the phase estimator to generate an adjusted phase value stream in response to the stream of phase estimates. A phase demodulator couples to the phase rotator to generate a first stream of symbol estimates in response to the adjusted phase value stream. A rate 1/N decoder, where N>1, couples to the phase estimator, and a rate 1/N encoder couples to the rate 1/N decoder and to the phase rotator. The rate 1/N encoder produces a second stream of symbol estimates in response to the stream of phase estimates so that the adjusted phase value stream is further responsive to this second stream of symbol estimates. A first differential decoder couples to the phase demodulator to differentially decode the first stream of symbol estimates into a first data estimate stream. A second differential decoder couples to the rate 1/N decoder to generate a second data estimate stream. The first and second data estimate streams together provide the information bits.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
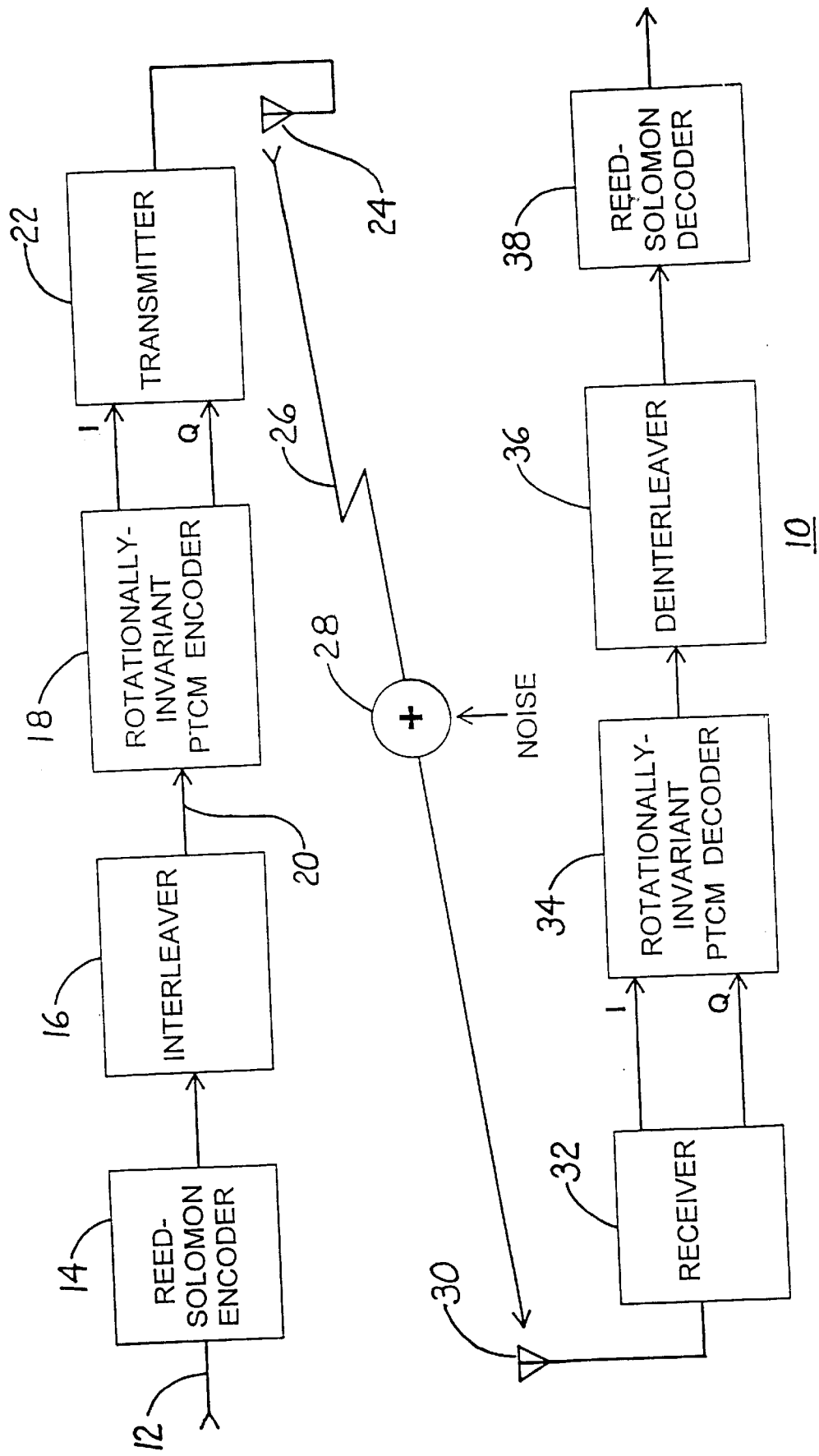
FIG. 1 shows a block diagram of a digital communication system configured in accordance with the teaching of the present invention.

FIG. 1 shows a block diagram of a digital communication system 10 configured in accordance with the teaching of the present invention. At a supply point 12, system 10 receives information bits or user data to be transmitted. In one embodiment of the present invention, concatenated coding is implemented. Accordingly, in this embodiment supply point 12 couples to an input of a Reed-Solomon or other block encoder 14. An output of Reed-Solomon encoder 14 couples to an input of an interleaver 16, and an output of interleaver 16 couples to an input of a rotationally invariant pragmatic trellis coded modulator (PTCM) 18. In another embodiment of the present invention, concatenated coding is omitted, and information bits are applied directly to PTCM 18. For convenience, the data supplied to PTCM 18 are referred to herein as information bits 20 regardless of whether concatenated coding is implemented. PTCM 18 is discussed in more detail below in connection with FIGS. 2–3.

PTCM 18 generates phase point data that may be in the form of I and Q quadrature signals which are supplied to a transmitter 22. Transmitter 22 couples to an antenna 24 from which a digital communication signal 26 is broadcast through a communication channel 28. As illustrated in FIG. 1, digital communication signal 26 is invariably corrupted to some degree by noise within channel 28. This noise-corrupted digital communication signal 26 is received at an antenna 30 which couples to an input of a receiver 32. In the preferred embodiments, receiver 32 implements a carrier-coherent reception scheme. Receiver 32 produces rectilinear (i.e. I and Q) or polar (i.e. φ and M, not shown) quadrature components which are then supplied to a rotationally invariant pragmatic trellis coded demodulator (PTCD) 34. PTCD 34 is discussed in more detail below in connection with FIG. 6.

PTCD 34 generates estimates of original information bits 20. In one embodiment of the present invention an output of PTCD 34 couples to an input of a deinterleaver 36, an output of which couples to an input of a Reed-Solomon or other block decoder 38. In another embodiment, deinterleaver 36 and Reed-Solomon decoder 38 are omitted.

Figure 2:
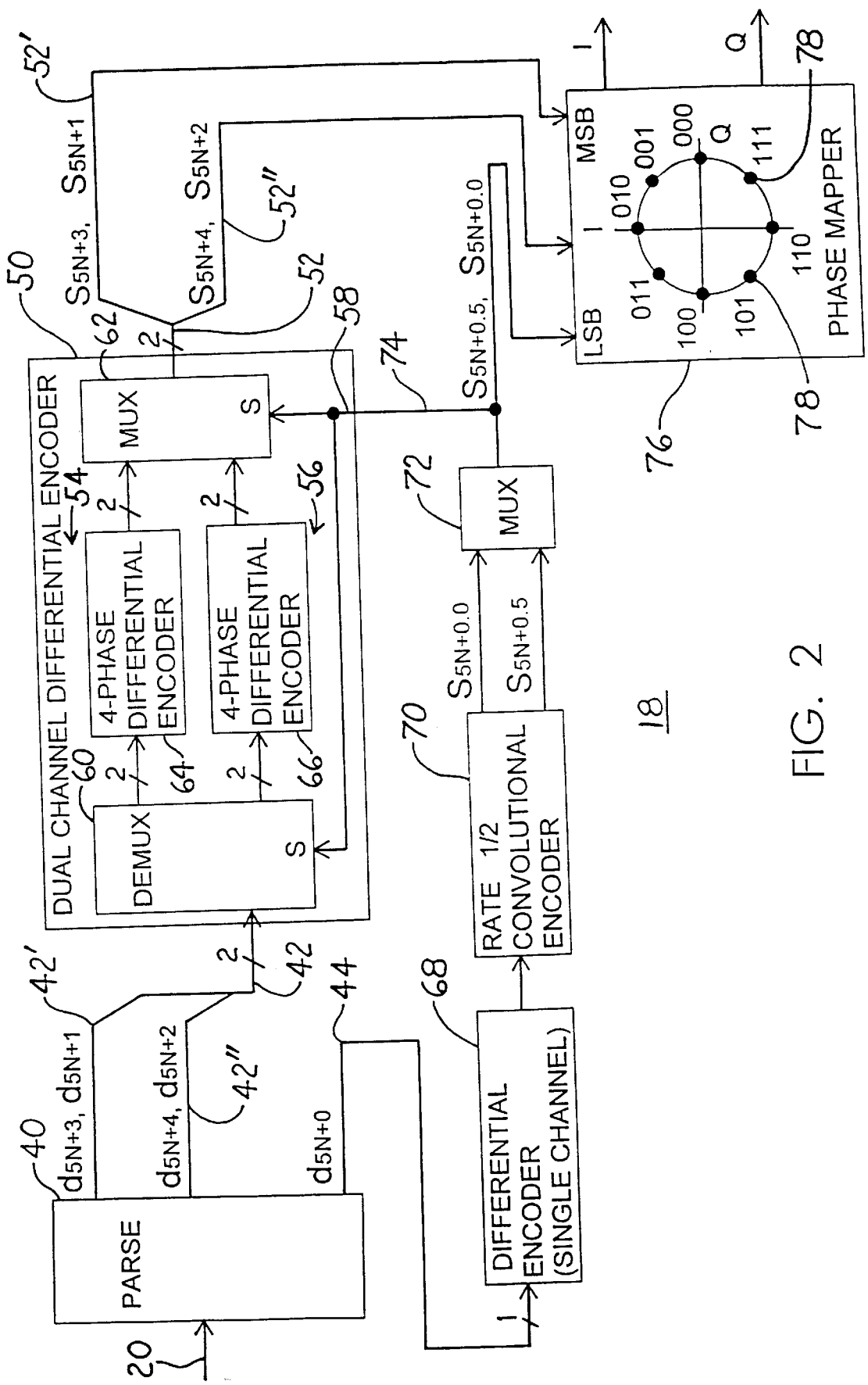
FIG. 2 shows a block diagram of a rotationally invariant pragmatic trellis coded modulation (PTCM) encoder portion of the digital communication system.
Figure 3:
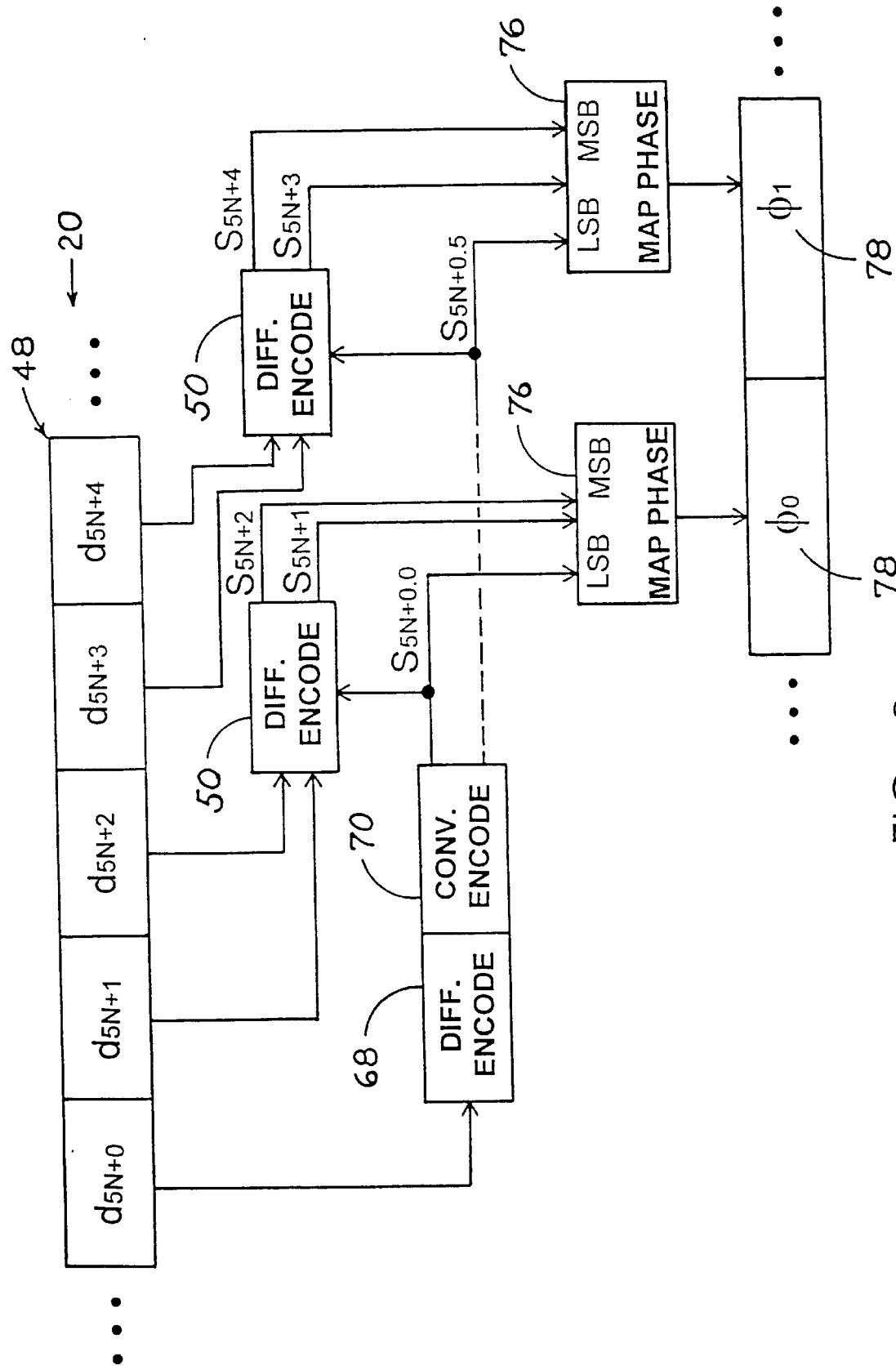
FIG. 3 shows a data flow diagram depicting the flow of certain data within the PTCM encoder.

FIG. 2 shows a block diagram of rotationally invariant PTCM 18, and FIG. 3 shows a data flow diagram depicting the flow of certain data within PTCM 18. Referring to FIGS. 2 and 3, a stream of information bits 20 is supplied to an input of a parsing block 40. Parsing block 40 partitions information bit stream 20 into a primary stream portion 42 and a secondary stream portion 44. PTCM 18 applies secondary modulation to secondary stream 44 and primary modulation to primary stream 42.

The present invention may be adapted to operate over a wide variety of modulation formats and orders and to produce a wide variety of effective code rates. However, for the sake of clarity the below presented discussion focuses on a preferred embodiment which adapts the present invention to an 8-PSK modulation format and order to achieve an effective code rate of 5/6. In the preferred embodiment, parsing block 40 routes four of every five information bits 20 into primary stream 42 and one of every five information bits 20 into secondary stream 44. Those skilled in the art will appreciate that the present invention is not limited to 8-PSK or an effective code rate of 5/6 and may be applied to different formats and orders, including 16-PSK, 16-QAM, 32-QAM, etc., and with different effective code rates, such as 7/8, 7/9, etc.

FIG. 2 depicts primary stream 42 as being further partitioned into sub-streams 42' and 42". For the preferred embodiment, information bits 20 are grouped into five-bit groups, referred to herein as "pent-tuples" 48. FIG. 3 shows a single pent-tuple 48 of information bit stream 20. Parsing block 40 sends the zero-th data bit of each pent-tuple (i.e. $d_{5N+0}$) into secondary stream 44. The letter "N" refers to an integer pent-tuple number. The first and third data bits of each pent-tuple (i.e. $d_{5N+1}$ and $d_{5N+3}$) are sent to primary sub-stream 42', and the second and fourth data bits of each pent-tuple (i.e. $d_{5N+2}$ and $d_{5N+4}$) are sent to primary sub-stream 42".

Primary streams 42' and 42" are supplied to inputs of a dual channel, four-phase, differential encoder 50. Differential encoder 50 produces a primary encoded stream 52, which includes primary encoded sub-streams 52' and 52" to correspond to primary sub-streams 42' and 42", respectively. Dual channel differential encoder 50 routes primary stream 42 into first and second encoding channels 54 and 56, respectively, in response to a selection input 58.

In particular, selection input 58 couples to selection inputs of a demultiplexer (DEMUX) 60 and a multiplexer (MUX) 62 of encoder 50. Primary stream 42 drives a data input of demultiplexer 60, and a first output of demultiplexer 60 couples to an input of a first four-phase differential encoder 64. First encoder 64 implements first encoding channel 54. A second output of demultiplexer 60 couples to an input of a second four-phase differential encoder 66. Second encoder 66 implements second encoding channel 56. Outputs of encoders 64 and 66 couple to inputs of multiplexer 62, and an output of multiplexer 62 serves as the output from dual channel differential encoder 50.

Each differential encoder 64 and 66 implements a single channel differential encoder. In other words, each encoder 64 and 66 generates outputs which represent the difference between the current information bit pair being processed by that encoder and the previous information bit pair processed by that encoder. Each of channels 54 and 56 simultaneously processes information bits 20 from primary substreams 42' and 42". A pair of information bits 20 (i.e. $d_{5N+1}/d_{5N+2}$ or $d_{5N+3}/d_{5N+4}$) is routed through only one of channels 54 and 56. That one channel is selected by the state of selection input 58.

A unit interval of time is required by system 10 (see FIG. 1) to communicate a single set of phase data. This unit interval represents the reciprocal of the baud rate. Over each unit interval, the relative phase of quadrature components of digital communication signal 26 (see FIG. 1) transitions from one set of phase data to another.

Referring to FIG. 2, during each unit interval, dual channel differential encoder 50 processes two information bits and produces two symbols. During one unit interval, symbols $S_{5N+1}$ and $S_{5N+2}$ result from processing the first and second information bits $d_{5N+1}$ and $d_{5N+2}$ of each pent-tuple 48. During the next unit interval, symbols $S_{5N+3}$ and $S_{5N+4}$ result from processing the third and fourth information bits $d_{5N+3}$ and $d_{5N+4}$ from each pent-tuple 48. The process repeats for subsequent pent-tuples 48.

Secondary stream 44 is supplied to a differential encoder 68. In the preferred embodiment, differential encoder 68 is a single channel, two-phase differential encoder. In other words, encoder 68 generates an output which represents the difference between the current information bit being processed by that encoder and the previous information bit processed by encoder 68 (i.e. $d_{5N+0}-d_{5(N-1)+0}$).

An output of differential encoder 68 couples to an input of an encoder 70. In the preferred embodiment, encoder 70 implements a transparent, recursive, K=7, rate 1/2 convolutional ("Viterbi") encoder. Encoder 70 may implement either a systematic or non-systematic code. Since encoder 70 implements a rate 1/2 code, two symbols are produced for each bit received from differential encoder 68. However, other rate 1/N encoders, where N>1, may be substituted. The two symbols produced for each bit received by encoder 70 are denoted as $S_{5N+0.0}$ and $S_{5N+0.5}$.

Since encoder 70 implements a transparent code, a linear relationship exists between the two outputs of encoder 70. In other words, if identical data streams except for one complemented bit are presented to encoder 70, then encoder 70 will produce corresponding symbol pairs for the data streams in which either both symbols are inverted or neither symbol is inverted.

The outputs of encoder 70 couple in parallel to a multiplexer (MUX) 72. Multiplexer 72 serializes the output from encoder 70 to produce a secondary encoded stream 74 made up of alternating symbols $S_{5N+0.0}$ and $S_{5N+0.5}$ generated from the zero-th information bits of each pent-tuple 48. Outputs from differential encoder 50 and from multiplexer 70 couple to inputs of a phase mapper 76. Phase mapper 76 is configured to concurrently map a symbol from primary encoded sub-stream 52' with a symbol from primary encoded sub-stream 52" and a symbol from secondary encoded stream 74. One mapping occurs for each unit interval. Each mapping causes a phase point datum 78 to be produced. Each phase point datum 78 is characterized by quadrature components which exhibit a predetermined relative phase. In a QAM implementation, each datum is further characterized by the magnitude of the resulting phase point datum 78.

An integer "K" equals the number of symbols being mapped and transmitted per unit interval. For the preferred 8-PSK embodiment depicted in FIG. 2, K equals three; but, K may also equal values greater than three. Phase mapper 76 produces one of $2^K$ possible phase points 78 for each unit interval.

FIG. 2 illustrates a preferred phase map between input symbols and phase point data 78. Inputs of phase mapper 76 are arranged from a least significant bit (LSB) to a most significant bit (MSB). Phase mapper 76 implements a binary code rather than the traditional Gray code. A binary code is characterized by the phase increasing at an increment of 2 $\pi/2^K$ as the input code increases by one. However, this is not the only code which will suffice for the purposes of the present invention. For codes employed by the preferred embodiments of the present invention, as phase point data 78 rotates, the least significant bit (LSB) of the input code alternates between zero and one for all adjacent phase points 78. One half of all pairs of adjacent phase points 78 have their two most significant bits (MSBs) in common. All pairs of adjacent phase points 78 are generated from pairs of opposing polarity LSB inputs. However, not all pairs of adjacent phase points 78 have their two MSBs in common.

Multiplexer 72 is configured so that one and only one of the two secondary encoded stream 74 symbols produced for each pent-tuple 48 is mapped per unit interval for the preferred rate 5/6, 8-PSK embodiment. Secondary encoded stream 74 is exclusively coupled to only one bit of phase mapper 76, and that one bit is the LSB. Consequently, secondary encoded stream 74 and only secondary encoded stream 74 drives the LSB of phase mapper 76. As a result, all secondary encoded stream symbols of a first polarity (e.g. a logical one) are mapped to a phase point 78 of (2n+1) (2 $\pi/2^K$), and all symbols of a second polarity (e.g. a logical zero) are mapped to a phase point 78 of (2n) (2 $\pi/2^K$), where n is an integer in the range of zero through $2^{K-1}$ -1. One and only one secondary encoded stream 74 symbol is mapped by phase mapper 76 per unit interval.

Figure 4:
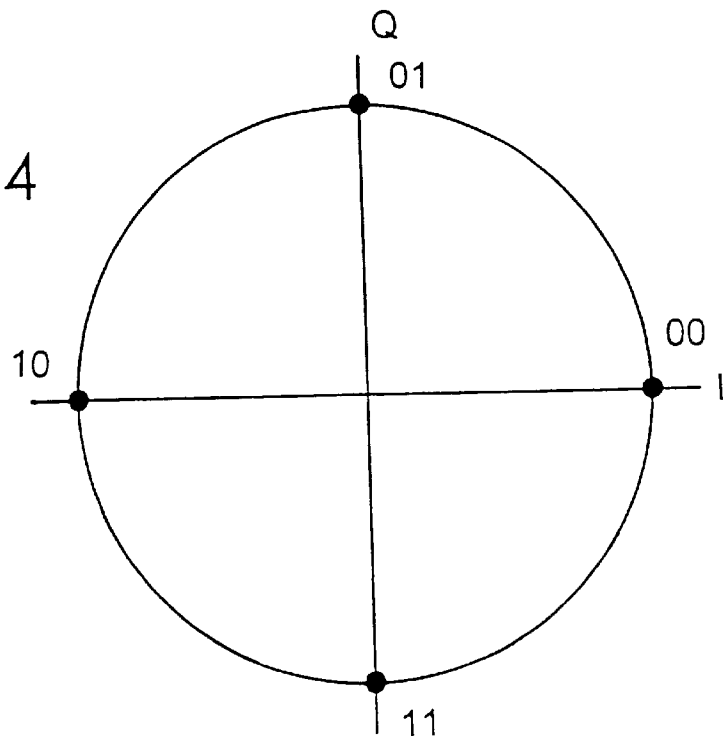
FIG. 4 shows a first QPSK phase constellation.
Figure 5:
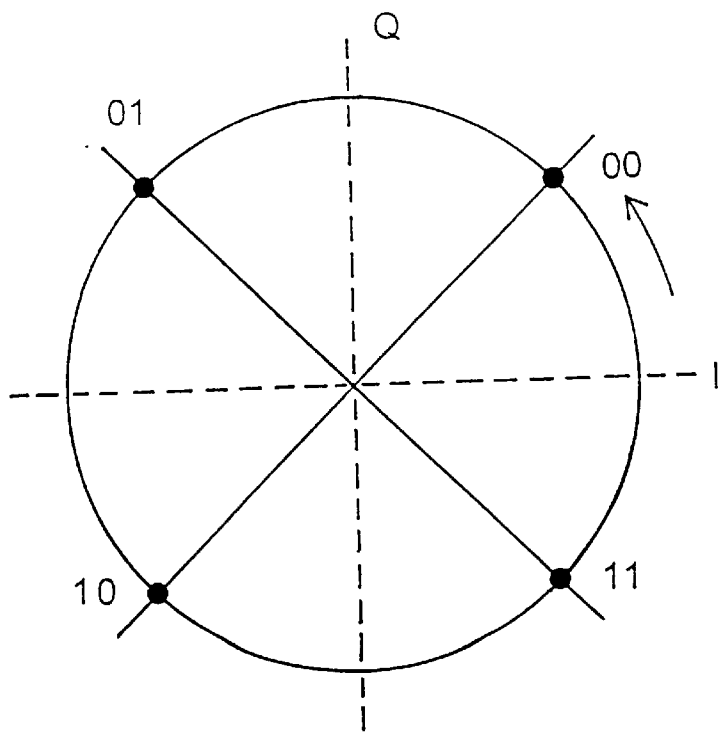
FIG. 5 shows a second QPSK phase constellation which is rotated 2 π/8 radians from the first QPSK phase constellation of FIG. 4.

FIG. 4 shows an "even" phase constellation 80, and FIG. 5 shows an "odd" QPSK phase constellation 82 which is rotated 2 $\pi$/K radians from even QPSK phase constellation 80, where K=3. The even and odd designations for constellations 80 and 82 have no significance other than to distinguish one from the other. The union of the first and second QPSK constellations provides the phase constellation implemented in phase mapper 76 (FIG. 2). Even constellation 80 describes the phase constellation for primary modulation when the secondary modulation for a given unit interval exhibits a logical zero polarity, and odd constellation 82 describes the phase constellation for primary modulation when the secondary modulation for a given unit interval exhibits a logical one polarity.

Referring to FIGS. 2, 4 and 5, the channel of dual channel differential encoder 50 through which primary stream 42 is routed for any unit interval is selected in response to the secondary encoded stream symbol being mapped in phase mapper 76 for that unit interval (i.e. secondary modulation). Accordingly, channel 54 of encoder 50 performs differential encoding when constellation 80 characterizes primary modulation, and channel 56 of encoder performs differential encoding when constellation 82 characterizes primary modulation.

Due to the phase constellation implemented in phase mapper 76, if carrier synchronization in receiver 32 (FIG. 1) causes a rotational inaccuracy of (2n) (2 $\pi/2^K$), then the resulting phase nevertheless continues to indicate the correct data for the secondary stream, regardless of the value of n. If a rotational inaccuracy of $(2n+1)$ $(2 \pi/2^K)$ occurs in receiver 32, then the resulting phase consistently indicates complemented data for the secondary stream, regardless of the value of n. Accordingly, due to the use of transparent coding in encoder 70, the above-described manner of driving phase mapper 76, and the phase constellation implemented in phase mapper 76, PTCD 34 (FIG. 1) reliably decodes secondary modulation, except for one factor. That one factor is that the secondary modulation may or may not be complemented. However, if the secondary modulation is complemented, it is consistently complemented for all secondary symbols received while receiver 32 operates at a consistent rotational inaccuracy. The use of differential encoder 68 makes system 10 (FIG. 1) insensitive to this one factor in a manner well understood by those skilled in the art.

PTCD 34 (FIG. 1) uses the reliably decoded secondary modulation to remove the secondary stream modulation to leave only primary modulation, which is QPSK in this preferred embodiment. By removing the secondary stream modulation, the coding gain of the secondary modulation is extended to the primary modulation. However, an ambiguity concerning whether or not the secondary modulation was inverted remains. Dual channel differential encoder 50 makes system 10 insensitive to this ambiguity. Accordingly, the primary stream receives the benefit of a strong convolutional code and uses dual channel differential encoding which is responsive to secondary modulation to resolve phase ambiguity. A rotationally invariant coding scheme results.

The data flow diagram shown in FIG. 3 depicts timing parameters for a single pent-tuple 48 in the preferred embodiment. Referring to FIGS. 2 and 3, the zero-th information bit of pent-tuple 48 is differentially encoded in encoder 68, then convolutionally encoded in encoder 70. Secondary encoded stream symbol $S_{5N+0.0}$ is first provided by multiplexer 72 (FIG. 2). The first and second information bits of pentuple 48 are differentially encoded together through dual channel differential encoder 50. When the first and second information bits are being differentially encoded in encoder 50, symbol $S_{5N+0.0}$ selects the channel 54 or 56 through which to route the first and second information bits. When the first and second information bits have been differentially encoded into first and second primary encoded stream symbols $S_{5N+1}$ and $S_{5N+2}$ secondary encoded stream symbol $S_{5N+0.0}$ is mapped with primary encoded stream symbols $S_{5N+1}$ and $S_{5N+2}$ through phase mapper 76 to produce a phase point datum $\phi_0$.

Secondary encoded stream symbol $S_{5N+0.5}$ then becomes available from multiplexer 72. The third and fourth information bits of pentuple 48 are differentially encoded together through dual channel differential encoder 50. When the third and fourth information bits are being differentially encoded in encoder 50, symbol $S_{5N+0.5}$ selects the channel 54 or 56 through which to route the third and fourth information bits. When the third and fourth information bits have been differentially encoded into third and fourth primary encoded stream symbols $S_{5N+3}$ and $S_{5N+4}$, secondary encoded stream symbol $S_{5N+0.5}$ is mapped with primary encoded stream symbols $S_{5N+3}$ and $S_{5N+4}$ through phase mapper 76 to produce a phase point datum $\phi_1$.

Each phase mapping performed by phase mapper 76 remains valid for one unit interval. Those skilled in the art will appreciate that rate conversion circuits may be included where appropriate so that phase mapping occurs at a constant rate and each unit interval duration exhibits an equal duration to the other unit intervals.

Figure 6:
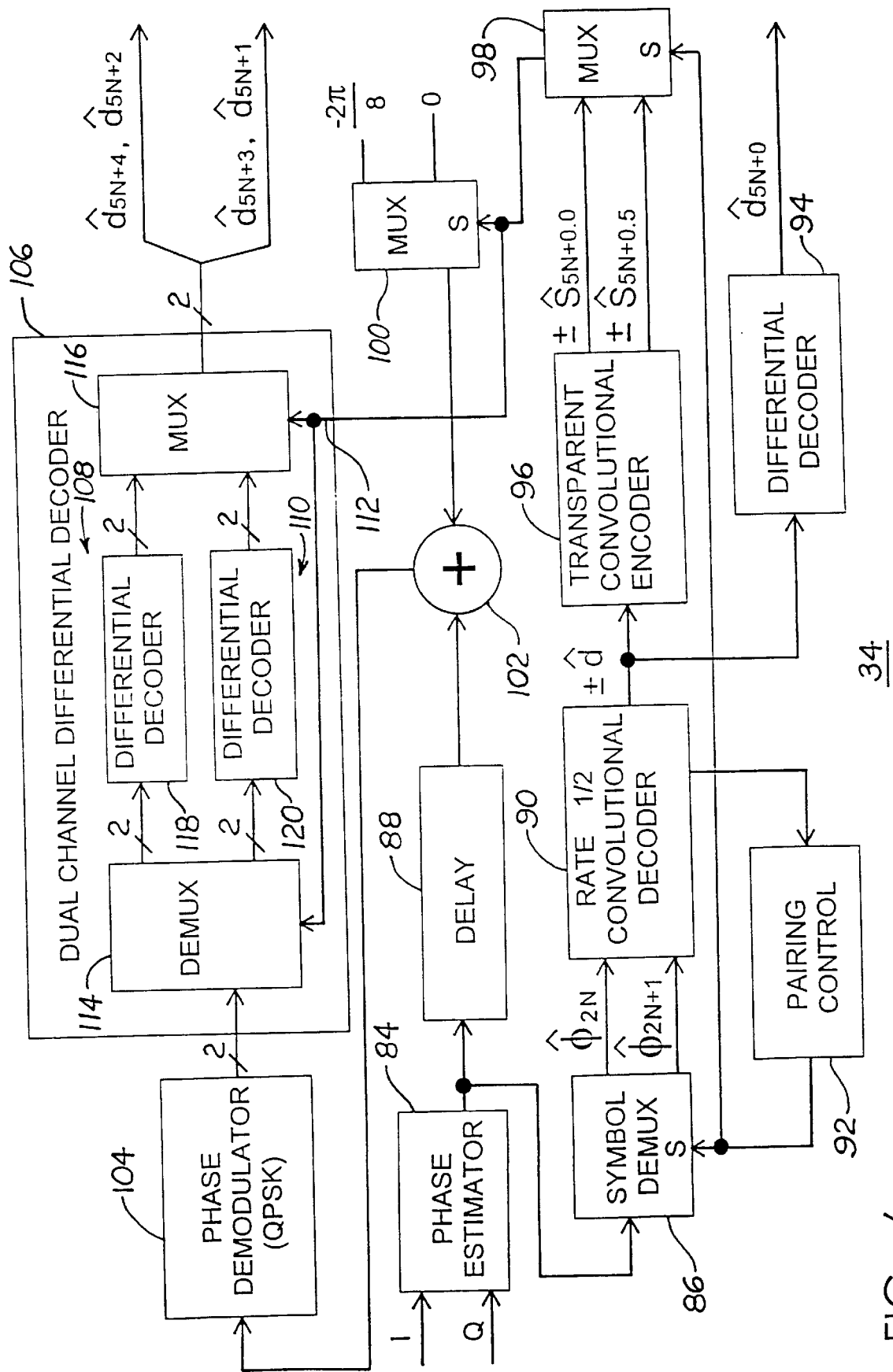
FIG. 6 shows a block diagram of a rotationally invariant PTCM decoder portion of the digital communication system.

FIG. 6 shows a block diagram of PTCD 34. Referring to FIG. 6, quadrature signal components from receiver 32 (FIG. 1) are supplied to a phase estimator 84. Phase estimator 84 estimates the phase indicated by the quadrature components. An estimated phase value is provided for each unit interval, and a stream of estimated phase values results. Each phase estimate conveys K symbols, where K=3 in the preferred 8-PSK embodiment. The estimated phase values are determined to a degree of precision that includes soft decision bits. For example, even though only three symbols are conveyed per unit interval in the preferred embodiment discussed herein, phase estimator 84 may characterize estimated phase values to a precision of 5–10 bits per phase value.

The estimated phase values are supplied to a demultiplexer (DEMUX) 86 and to a delay block 88. Demultiplexer 86 and delay block 88 may, but need not, receive the same sets of bits produced for each estimated phase value. For example, demultiplexer circuit 86 may receive bits of lesser significance while delay block 88 receives bits of greater significance, with considerable overlap between the two sets.

Demultiplexer 86 groups pairs of estimated phase values for presentation to a rate 1/2 convolutional ("Viterbi") decoder 90. Each pair of estimated phase values conveys secondary encoded symbols $S_{5N+0.0}$ and $S_{5N+0.5}$ produced in response to a single information bit. FIG. 6 denotes such pairs as including estimated phase values $\hat{\phi}_{2N}$ and $\hat{\phi}_{2N+1}$. Convolutional decoder 90 performs a complementary operation to that performed by convolutional encoder 70 (FIG. 2). Accordingly, convolutional decoder 90 produces one information bit estimate $\pm \hat{d}$ for each pair of phase value estimates $\hat{\phi}_{2N}$ and $\hat{\phi}_{2N+1}$. In other words, decoder 90 produces secondary stream data estimates at a rate of 1/N estimates per unit interval, where N>1. In the preferred embodiment, decoder 90 produces one data estimate $\pm \hat{d}$ for every two unit intervals.

Those skilled in the art will appreciate that convolutional decoder 90 may process each pair of estimated phase values for numerous unit intervals before generating a data estimate. The output from decoder 90 provides an intermediate data estimate stream that represents an estimate of secondary stream 44 (FIG. 2). In other words, decoder 90 provides an estimate of differentially encoded secondary information bit stream 44. As discussed above, receiver 32 (FIG. 1) may arbitrarily lock at a phase which causes a complement of the secondary stream to be observed at PTCD 34. Accordingly, the intermediate data estimate stream may be either of a correct polarity or inverted. For that reason, FIG. 6 references the intermediate data estimates with a "±" prefix (i.e. $\pm \hat{d}$).

Demultiplexer 86 identifies the appropriate pairing of phase estimates through a timing signal received from a pairing controller 92. Pairing controller 92 couples to convolutional decoder 90 to generate its timing signal. For example, upon initiation pairing controller 92 may dwell sufficiently long in one possible pairing state to monitor a valid output from convolutional decoder 90. When convolutional decoder 90 indicates valid data, the appropriate pairing has been determined. If valid data is not indicated, then pairing controller 92 may toggle to an alternate pairing state and continue to monitor for a valid output from convolutional decoder 90.

An output of convolutional decoder 90 provides the intermediate data estimate stream to a differential decoder 94 and rate 1/2, transparent, convolutional encoder 96 in the preferred embodiment. Differential decoder 94 decodes the differential encoding applied to secondary stream 44 by differential encoder 68 in PTCM 18 (FIG. 2). Through the operation of encoder 68 and decoder 94, system 10 is insensitive to the ambiguous polarity of the secondary modulation stream. The differentially decoded data stream provides estimates $\hat{d}_{5N+0}$ which correspond to secondary stream 44 (FIG. 2).

Convolutional encoder 96 is desirably identical to convolutional encoder 70 of PTCM 18 (FIG. 2). If convolutional encoder 70 implements a given rate 1/N code, with N>1, then convolutional encoder 96 implements that same code. Accordingly, if the intermediate data estimate stream correctly estimates differentially encoded secondary stream 44, then a secondary stream of symbol estimates produced by convolutional encoder 96 includes symbol estimates $\pm\hat{S}_{5N+0.0}$ and $\pm\hat{S}_{5N+0.5}$ which equal corresponding symbols $S_{5N+0.0}$ and $S_{5N+0.5}$ produced by convolutional encoder 70 in PTCM 18. A pair of symbol estimates $\pm\hat{S}_{5N+0.0}$ and $\pm\hat{S}_{5N+0.5}$ are produced by encoder 96 every two unit intervals.

Convolutional encoder 96 implements a transparent code because this type of code provides polarity correspondence across convolutional encoder 96. Thus, if the secondary stream is inverted due to an arbitrary rotational lock point of receiver 32 (FIG. 1), all secondary stream symbol estimates output from convolutional encoder 96 are inverted.

Encoder 96 couples to a multiplexer (MUX) 98. In addition, pairing control circuit 92 couples to a select input of multiplexer 98. Multiplexer 98 serializes the secondary stream of symbol estimates in a manner like that described above for multiplexer 72 (FIG. 2).

The serialized secondary symbol estimates are used to selectively rotate the estimated phase values from the estimated phase value stream. Rotation is in an amount of either zero or $-2\pi/2^K$, where K is equal to the number of symbols transmitted per unit interval. Whether rotation is to be applied or not for each unit interval is determined in response to the polarity of the estimated secondary stream symbol $\pm\hat{S}_{5N+0.0}$ or $\pm\hat{S}_{5N+0.5}$ for that unit interval.

In particular, an output from multiplexer 98 couples through a multiplexer (MUX) 100 to a summation circuit 102. The serialized estimated secondary symbol stream from multiplexer 98 controls a selection input of multiplexer 100. This selection input selects a constant phase value of either zero or $-2\pi/2^K$ for application to summation circuit 102. In the preferred 8-PSK embodiment, K=3 and $2^K=8$. Summation circuit 102 also receives the estimated phase values from phase estimator 84 delayed through delay block 88. Delay block 88 delays estimated phase values by a sufficient duration to achieve coincidence between symbols of the primary and secondary streams. Coincidence is achieved when a secondary symbol estimate from multiplexer 98 is output at the same instant a phase value which conveyed the secondary symbol estimate is output from delay block 88.

Summation circuit 102 removes the secondary modulation from the phase value, leaving the primary modulation. In the preferred embodiment, the primary modulation is QPSK. Accordingly, an output of summation circuit 102 provides an adjusted estimated QPSK phase value stream to an input of a QPSK phase demodulator 104. Phase demodulator 104 performs a $2^{K-1}$-PSK (K=3 in the preferred embodiment) demodulation to estimate the polarity of the two primary encoded sub-stream 52' and 52" symbols (FIG. 2), for each unit interval. Demodulator 104 generates a primary symbol estimate stream.

The two primary sub-stream symbol estimates for each unit interval are provided to a dual channel, 4-phase differential decoder 106. Dual channel decoder 106 is the complement to dual channel encoder 50 included in PTCM 18 (FIG. 2). Dual channel differential decoder 106 routes the primary symbol estimate stream generated by demodulator 104 into first and second decoding channels 108 and 110, respectively, in response to a selection input 112.

In particular, selection input 112 couples to selection inputs of a demultiplexer (DEMUX) 114 and a multiplexer (MUX) 116 of decoder 106. The primary symbol estimate stream drives a data input of demultiplexer 114, and a first output of demultiplexer 114 couples to an input of a first four-phase differential decoder 118. First decoder 118 implements first decoding channel 108. A second output of demultiplexer 114 couples to an input of a second four-phase differential decoder 120. Second decoder 120 implements second decoding channel 110. Outputs of decoders 118 and 120 couple to inputs of multiplexer 116, and an output of multiplexer 116 serves as the output from dual channel differential decoder 106.

Each differential decoder 118 and 120 implements a single channel, four-phase differential decoder. Each of channels 108 and 110 simultaneously process a pair of primary stream symbol estimates. A pair of primary stream symbol estimates are routed through only one of channels 108 and 110. That one channel is selected by the state of selection input 112.

Selection input 112 is driven by a secondary symbol estimate from multiplexer 98. Accordingly, secondary symbol estimates control whether primary stream symbol estimates are routed through channel 108 or 110. As discussed above, phase constellation 80 (FIG. 4) corresponds to secondary symbols having a logic zero polarity and phase constellation 82 (FIG. 5) corresponds to secondary symbols having a logic one polarity. First and second channels 54 and 56 of dual channel encoder 50 (FIG. 2) perform differential encoding in response to secondary modulation. First and second channels 108 and 110 perform complementary decoding operations in response to estimated secondary modulation. Accordingly, regardless of whether a polarity inversion has occurred in the secondary stream symbol estimates due to an ambiguous phase lock state of receiver 32 (FIG. 1), differential decoding occurs in a manner consistent with the differential encoding applied in PTCM 18. As a result, any influence of a polarity inversion in the secondary modulation caused by an ambiguous phase lock state has been eliminated. An arbitrary (2n) $(2\pi/2^K)$ phase lock of receiver 32 is compensated by differential decoding. An arbitrary (2n+1) $(2\pi/2^K)$ phase lock of receiver 32 is compensated through the use of dual channels.

Accordingly, for each pent-tuple 48 (FIG. 3), PTCD 34 provides estimates of the zero-th secondary information bits $\hat{d}_{5N+0}$ from differential decoder 94, estimates for the first and third primary information bits $\hat{d}_{5N+1}$ and $\hat{d}_{5N+3}$ from decoder 106, and estimates for the second and fourth primary information bits $\hat{d}_{5N+2}$ and $\hat{d}_{5N+4}$ from decoder 106.

An alternate embodiment to that described above may, but is not required to, use a single channel, four-phase differential encoder in lieu of encoder 50 (FIG. 2) and a single channel, four-phase differential decoder in lieu of decoder 106. In this alternate embodiment, detection of a polarity inversion in the secondary modulation stream is performed and corrected in PTCD 34. A polarity inversion in the secondary modulation stream may be detected by performing a QPSK phase mapping operation upon the primary symbol estimates generated by phase demodulator 104 and finding the difference between these mapped phases and the adjusted phase value stream input to demodulator 104. That difference may then be converted to absolute values and integrated or averaged over a number of unit intervals. If the phase differences are found to cluster around zero degrees, then no secondary modulation stream polarity inversion has occurred. However, if the phase differences are found to cluster around $\pi/2^K$, then a secondary modulation stream polarity inversion has occurred. An exclusive OR gating function located between multiplexer 100 and summation circuit 102 may be used to selectively correct any polarity inversion which is detected.

While this alternate embodiment adequately achieves a rotationally invariant PTCM communication scheme for many applications, it may be less desirable than the above-described dual channel differential encoder and decoder scheme in other applications because several unit intervals must transpire before a polarity inversion may be reliably detected.

In summary, the present invention provides an improved rotationally invariant pragmatic trellis coded digital communication system and method. A rotationally invariant modulator and demodulator are provided. The modulator and demodulator implement a rotationally invariant pragmatic trellis coded modulation scheme which is operable at modulation orders higher than QPSK.

The present invention has been described above with reference to preferred embodiments. However, those skilled in the art will recognize that changes and modifications may be made in these preferred embodiments without departing from the scope of the present invention. These and other changes and modifications which are obvious to those skilled in the art are intended to be included within the scope of the present invention.

What is claimed is:

1. A rotationally invariant pragmatic trellis coded modulator for encoding information bits to be communicated so that phase ambiguities are resolvable, said modulator comprising:

a first differential encoder which produces a first encoded symbol stream in response to a first portion of said information bits;

a second differential encoder adapted to receive a second portion of said information bits;

a rate 1/N encoder, where N>1, coupled to said second differential encoder to produce a second encoded symbol stream which is responsive to said second portion of said information bits; and a phase mapper having at least three inputs for mapping at least three symbols per unit interval from said first and second encoded symbol streams, said phase mapper being coupled to said first differential encoder and to said rate 1/N encoder so that no more than one symbol from said second encoded symbol stream is mapped per unit interval.

2. A modulator as claimed in claim 1 wherein:

said plurality of inputs of said phase mapper are arranged from a least significant bit to a most significant bit; and said second encoded symbol stream drives said least significant bit of said phase mapper.

3. A modulator as claimed in claim 1 wherein:

said plurality of inputs of said phase mapper are arranged from a least significant bit to a most significant bit; and said phase mapper is configured so that all pairs of adjacent phase data mapped by said phase mapper are generated from pairs of opposing polarity least significant bit inputs.

4. A modulator as claimed in claim 3 wherein said second encoded symbol stream drives said least significant bit of said phase mapper.

5. A modulator as claimed in claim 1 wherein said first differential encoder is configured as a dual channel differential encoder.

6. A modulator as claimed in claim 5 wherein:

said first differential encoder performs differential encoding through a first encoding channel and a second encoding channel; and said first differential encoder couples to said rate 1/N encoder so that said first portion of said information bits is routed through said first and second encoding channels in response to said second encoded symbol stream.

7. A modulator as claimed in claim 6 wherein, during each unit interval:

one symbol from said second encoded symbol stream is mapped by said phase mapper;

said one mapped symbol selects one of said first and second encoding channels through which to route two of said first portion of said information bits to generate a corresponding two symbols of said first encoded symbol stream; and said two symbols of said first encoded symbol stream are mapped by said phase mapper.

8. A modulator as claimed in claim 1 wherein:

said first portion of said information bits comprises ⅔ of said information bits;

said second portion of said information bits comprises ⅓ of said information bits;

said rate 1/N encoder is a rate 1/2 convolutional encoder; and said phase mapper performs an 8-PSK mapping, so that said modulator performs a rate 5/6, 8-PSK modulation.

9. A rotationally invariant pragmatic trellis coded modulation method for encoding information bits to be communicated so that phase ambiguities are resolvable, said method comprising the steps of:

differentially encoding a first portion of said information bits through a dual channel differential encoder to produce a first encoded symbol stream;

convolutionally encoding a second portion of said information bits to produce a second encoded symbol stream; and phase mapping a plurality of symbols per unit interval from said first and second encoded symbol streams using a phase map in which all pairs of adjacent phase data are generated from pairs of opposing polarity least significant bit inputs.

10. A method as claimed in claim 9 additionally comprising the step of driving said phase map so that said second encoded symbol stream provides only said least significant bit inputs to said phase map.

11. A method as claimed in claim 9 additionally comprising the step of differentially encoding said second portion of said information bits prior to said convolutionally encoding step.

12. A method as claimed in claim 9 wherein:

said dual channel differential encoder performs differential encoding through a first encoding channel and a second encoding channel; and said method additionally comprises the step of routing said first portion of said information bits through said first and second encoding channels in response to said second encoded symbol stream.

13. A rotationally invariant pragmatic trellis coded demodulator for decoding communicated information bits received with potential phase ambiguities, said demodulator comprising:

a phase estimator configured to generate a stream of phase estimates;

a phase rotator coupled to said phase estimator to generate an adjusted phase value stream in response to said stream of phase estimates;

a phase demodulator coupled to said phase rotator to generate a first stream of symbol estimates in response to said adjusted phase value stream;

a rate 1/N decoder, where N>1, coupled to said phase estimator;

a rate 1/N encoder coupled to said rate 1/N decoder and to said phase rotator to produce a second stream of symbol estimates in response to said stream of phase estimates so that said adjusted phase value stream is further responsive to said second stream of symbol estimates;

a first differential decoder coupled to said phase demodulator, said first differential decoder being configured to differentially decode said first stream of symbol estimates into a first data estimate stream; and a second differential decoder coupled to said rate 1/N decoder to generate a second data estimate stream, wherein said first and second data estimate streams together provide said information bits.

14. A demodulator as claimed in claim 13 wherein said rate 1/N decoder produces data estimates at a rate of 1/N data estimate per unit interval.

15. A demodulator as claimed in claim 13 wherein:

said information bits are carried in a digital communication signal that conveys k symbols per unit interval, where k is an integer; and said phase rotator selectively rotates each phase estimate from said stream of phase estimates by either zero or $2\pi/2^k$.

16. A demodulator as claimed in claim 15 wherein:

said rate 1/N encoder produces one symbol estimate during each unit interval; and said phase rotator is configured to selectively rotate one phase estimate during each unit interval in response to said one symbol estimate.

17. A demodulator as claimed in claim 13 wherein:

said information bits are carried in a digital communication signal that conveys k symbols per unit interval, where k is an integer; and said phase demodulator performs a $2^{K-1}$-PSK demodulation.

18. A demodulator as claimed in claim 13 wherein said first differential decoder is configured as a dual channel differential decoder and couples to said rate 1/N encoder so that said first differential decoder differentially decodes said first stream of symbol estimates under control of said second stream of symbol estimates.

19. A demodulator as claimed in claim 18 wherein:

said first differential decoder performs differential decoding through a first decoding channel and a second decoding channel; and said first differential decoder couples to said rate 1/N encoder so that said first stream of symbol estimates is routed through said first and second decoding channels in response to said second stream of symbol estimates.

20. A demodulator as claimed in claim 13 wherein:

said information bits are carried in a digital communication signal that conveys 3 symbols per unit interval;

said 1/N decoder is a rate 1/2 convolutional decoder;

said phase demodulator and said first differential decoder are each configured so that said first data estimate stream has two data estimates per unit interval; and said second differential decoder is configured so that said second data estimate stream has one data estimate per unit interval.

21. A rotationally invariant pragmatic trellis coded demodulation method for decoding communicated information bits received with potential phase ambiguities, said method comprising the steps of:

a) generating a stream of phase estimates in response to a received digital communication signal;

b) selectively adjusting phase estimates from said stream of phase estimates to generate an adjusted phase value stream, said phase estimates being adjusted in response to a second stream of symbol estimates;

c) phase demodulating said adjusted phase value stream to generate a first stream of symbol estimates;

d) decoding said stream of phase estimates to generate an intermediate data estimate stream;

e) generating said second stream of symbol estimates by encoding said intermediate data estimate stream;

f) differentially decoding said first stream of symbol estimates through a dual channel differential encoder to produce a first data estimate stream; and g) differentially decoding said intermediate data estimate stream to produce a second data estimate stream, wherein said first and second data estimate streams together provide said information bits.

22. A method as claimed in claim 21 wherein:

said dual channel differential decoder performs differential decoding through a first decoding channel and a second decoding channel; and said method additionally comprises the step of routing said first stream of symbol estimates through said first and second encoding channels in response to said second stream of symbol estimates.

23. A method as claimed in claim 21 wherein said step d) decodes said stream of phase estimates using a rate 1/N decoder, where N>1, to produce intermediate data estimates at a rate of 1/N intermediate data estimate per unit interval.

24. A method as claimed in claim 21 wherein:

said digital communication signal conveys k symbols per unit interval, where k is an integer number; and said step b) comprises the step of selectively rotating each phase estimate from said stream of phase estimates by either zero or $2\pi/2^k$.

25. A method as claimed in claim 21 wherein:

said digital communication signal conveys k symbols per unit interval, where k is an integer number; and said step c) comprises the step of performing a $2^{K-1}$-PSK demodulation.

* * * * *